(12) United States Patent
Parthasarathy et al.

(10) Patent No.: US 8,379,339 B2
(45) Date of Patent: Feb. 19, 2013

(54) CLOSELY COUPLED VECTOR SEQUENCERS FOR A READ CHANNEL PIPELINE

(75) Inventors: Sivagnanam Parthasarathy, Carlsbad, CA (US); Alessandro Risso, San Diego, CA (US); Dillip Dash, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 124 days.

(21) Appl. No.: 12/896,609

(22) Filed: Oct. 1, 2010

(65) Prior Publication Data

US 2011/0080668 A1    Apr. 7, 2011

Related U.S. Application Data

(60) Provisional application No. 61/247,864, filed on Oct. 1, 2009.

(51) Int. Cl.
*G11B 5/09* (2006.01)
(52) U.S. Cl. ............................... 360/39; 360/46; 360/51
(58) Field of Classification Search ........................ None
See application file for complete search history.

(56) References Cited

U.S. PATENT DOCUMENTS

| | | | |
|---|---|---|---|
| 7,136,239 B2 * | 11/2006 | Fung et al. | 360/39 |
| 7,768,732 B2 | 8/2010 | Ozdemir | |
| 7,773,324 B2 | 8/2010 | Ozdemir | |
| 2007/0297079 A1 * | 12/2007 | Motwani | 360/51 |
| 2008/0192378 A1 * | 8/2008 | Bliss et al. | 360/69 |
| 2009/0300466 A1 * | 12/2009 | Yoshimura | 714/769 |

* cited by examiner

*Primary Examiner* — Regina N Holder
(74) *Attorney, Agent, or Firm* — Graybeal Jackson LLP (57) ABSTRACT

A system and method involving a read channel pipeline having a plurality of vector sequencers that may be used to control the processing blocks. In one embodiment, a read channel pipeline may include processing blocks that may be controlled a command word provided by vector sequencers. Incoming data may be delineated by identifying an early period, a steady-state period, and a trailing period. Instead of controlling these blocks with a static state machine controller, a plurality of vector sequencers are coupled to the plurality of processing blocks. Thus, a first vector sequencer may control the processing blocks during the early period and the steady state period, but then hand off control to a second vector sequencer for the trailing period. Using vector sequencers for implementing command words allows for greater programming flexibility once the device has been manufactured and deployed for use.

30 Claims, 4 Drawing Sheets

CLOSELY COUPLED VECTOR SEQUENCERS FOR A READ CHANNEL PIPELINE

PRIORITY CLAIM TO PROVISIONAL PATENT APPLICATION

This patent application claims priority to U.S. Provisional Patent Application No. 61/247,864 entitled 'CLOSELY COUPLED VECTOR SEQUENCERS FOR A READ-CHANNEL PIPELINE' filed on Oct. 1, 2009 and is hereby incorporated by reference.

BACKGROUND

Computer systems and communication systems read and receive data from disks and communication channels in an effort to convey meaningful data stored or transmitted from elsewhere. As data is received (either via reading from a computer-readable medium or by receiving data from a communications channel), a data-drive system may often process the data through a read channel to accomplish a number of data processing tasks so that the data is read interpreted quickly and accurately. Thus, a typical read channel may include a number of processing blocks for accomplishing the various data processing tasks that ensure quick and accurate data interpretation.

The processing blocks of a typical read channel, in conventional systems, may be controlled by one or more state machines that contain static operating parameters for processing the data through the read channel. Thus, each processing block may include a corresponding state machine. Each of the state machines includes counters or registers that store values identifying a state. Each state machine also includes logic circuitry that changes the current state of the state machine based on inputs or other factors as data is processed. The logic circuitry also defines the outputs produced by the state machine in each state. The outputs of each state machine may control a processing block or another state machine. State machines may be designed to provide the desired level of control over each of the processing blocks. However, state machines are typically permanently programmed at manufacture time according to desired common operating parameters for the read channel. Changing the programming of these state machines is difficult and not cost-effective once the read channel is deployed in a device in use. Furthermore, once programmed and operating, one cannot switch between different programmed parameters for the state machines while in operation.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

As discussed briefly above, read channels that process data through processing blocks controlled by pre-programmed and static state machines prove to be difficult to reprogram or change operating parameters once deployed in a device. However, in an embodiment of the subject matter disclosed herein, a read channel may include a plurality of vector sequencers that may be used to control the processing blocks of the read channel pipeline in a more dynamic manner. In one embodiment, each of the processing blocks may be controlled by an input configured to receive data in blocks such as a code word. The code word may be delineated by identifying specific periods corresponding to specific data therein. Thus, an early period may include preamble data, a steady-state period may include usable data, and a trailing period may include parity data. In the read channel pipeline then, a plurality of sequential processing blocks are configured to manipulate the data received at the input. In order to control these processing blocks, a command word may include specific fields that correspond to respective processing blocks. Instead of controlling these blocks with a static state machine controller, in this embodiment a plurality of vector sequencers are coupled to the plurality of processing blocks. Thus, a first vector sequencer may control the processing blocks during the early period and the steady state period, but then hand off control to a second vector sequencer for the trailing period. Using vector sequencers for implementing command words allows for greater programming flexibility once the device has been manufactured and deployed for use. These and other aspects of the embodiments discussed herein are better understood with respect to the discussion below of FIGS. 1-5.

Figure 1:
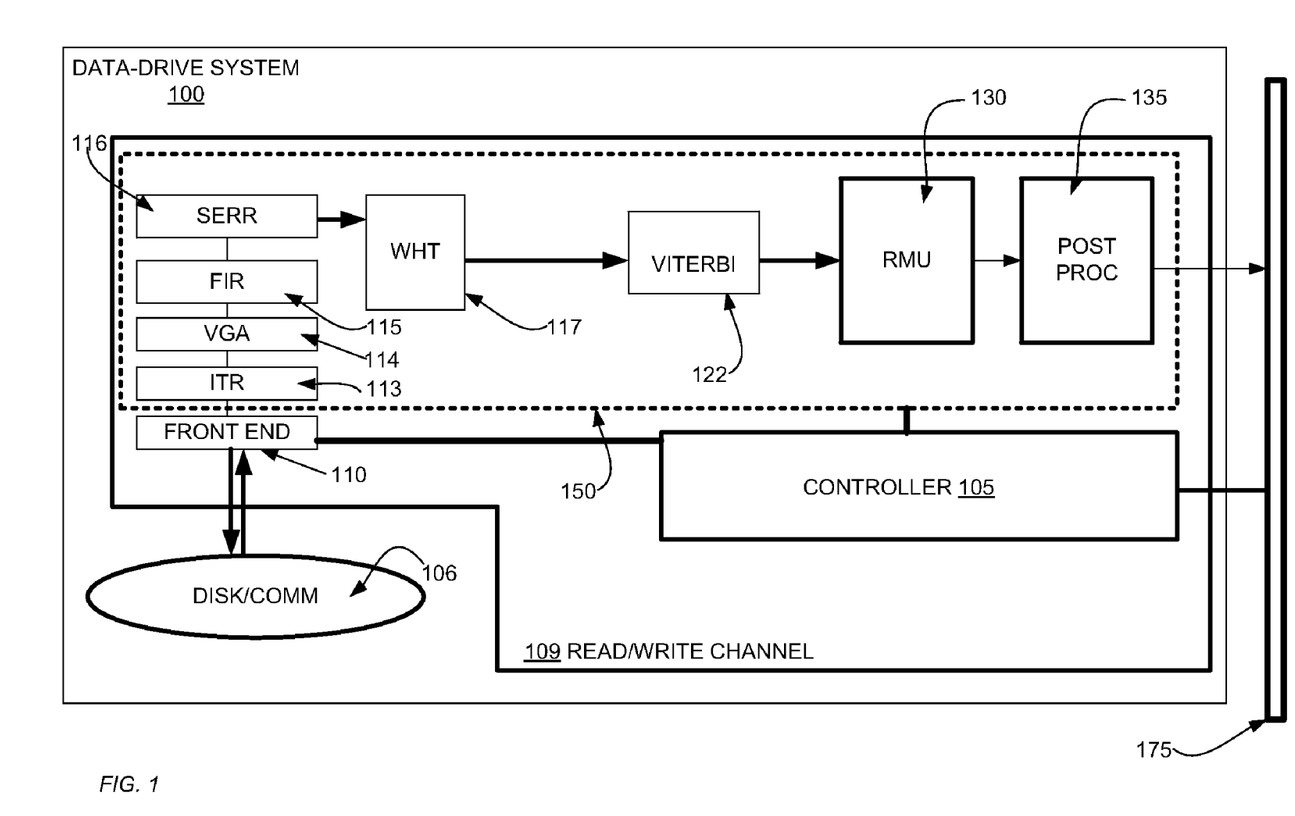
FIG. 1 is a block diagram of an embodiment of a hard-disk-drive system according to an embodiment of the subject matter discussed herein.

FIG. 1 is a block diagram of a hard-disk-drive (HDD) system 100 according to an embodiment of the subject matter disclosed herein. Such an HDD system 100 may read data from a hard disk 106 or write data to the hard disk. For the purposes of the subject matter herein, only the read operation of the HDD 100 is discussed. It is also understood by the skilled artisan that such a description of the processes discussed herein applied equally to data transmitted from a communication network which is similar to the read operation.

Generally speaking, the HDD 100 may include a read/write channel 109 that may write data to or read data from a disk 106. When data is to be read from the disk 106, a read head (not shown in the front end 110) interprets signals detected on the disk 106 to produce a stream of bits to be sent to a read data path which is referred to as the read channel pipeline 150 throughout the remainder of this disclosure. Further, a controller 105 may control the operation of the front-end 110 and the entire read channel pipeline 150.

The read channel pipeline 150 may include amplification and processing circuitry that assists with reading of data stored on the disk 106. Such circuitry may include an interpolated timing recovery component (ITR) 113 for altering the phase of an actual sample of the data signal such that an altered sample has substantially the same magnitude/phase that the actual sample would have had if the sample clock had been synchronized to the data. An example of an ITR circuit that may be the same as or similar to the ITR circuit 40 is disclosed in U.S. Pat. No. 6,556,633 and U.S. Publication No. 2002/0067781, which is incorporated herein by reference.

Next, the read channel pipeline includes a variable gain/offset amplifier (VGA) 114 that is part of a gain-acquisition (GA) loop for acquiring the gain of the read channel that sets the amplitude of the read signal to a desired level. Further, the read channel pipeline 150 includes a finite-impulse-response filter (FIR) 115 that equalizes the phase-corrected and sampling-rate-compensated samples from the ITR 40 to a time-domain waveform that corresponds to target polynomial (e.g., PR4, EPR4, $E^2PR4$) that represents or approximates the frequency response of the data signal. Still further, the read channel pipeline 150 includes a sample error recovery component (SERR) 116 suited to provide additional processing for error-recovery and a whitener filter block (WHT) 117 suited to filter any noise in the digital signal to toward a known white noise signal (as opposed to a noise signal that may have some kind of repeatable characteristic that may affect the actual digital read signal). Such components of the read channel pipeline are described in greater detail in related U.S. Pat. No. 7,768,732 entitled A GAIN CONTROLLER FOR A GAIN LOOP OF A READ CHANNEL AND RELATED GAIN LOOPS, READ CHANNELS, SYSTEMS, AND METHODS and U.S. Pat. No. 7,773,324 B2, entitled PHASE ACQUISITION LOOP FOR A READ CHANNEL AND RELATED READ CHANNEL SYSTEM AND METHOD, both of which are incorporated herein by reference.

The front end 110 may convert the data stored on the disk 106 into an analog read signal through a pre-amplifier stage, a gain stage, and an analog-to-digital converter (ADC) (all of which are not shown inside the front end 110). Together, these components adjust the amplitude of the analog read signal to a predetermined value or range of values deemed suitable for the subsequent components of the read channel pipeline 150. The ADC samples the gain-adjusted analog read signal and converts the analog read signal into a digital read signal that may then be passed to the read channel pipeline 150.

The read channel pipeline 150 then interprets signals from the front end 110 on a bit-by-bit basis to reconstruct the symbols of the codeword. One component for accomplishing this interpretation is a Viterbi detector 122. The Viterbi detector 122 processes the sampled digital read signal to produce a signal comprising a stream of bits having definitive logical values representing "1" or "0". An example of a Viterbi detector that may be the same as or similar to the Viterbi detector as disclosed in U.S. Pat. No. 6,662,338 and U.S. Publication Nos. 2004/0010749 and 2004/0010748, which are incorporated by reference. After the Viterbi detector 122 generates a digital bit stream, a Reliability Metric Unit (RMU) 130 for assisting with fixing and/or recovering from specific kinds of data-reading errors. Finally, the read channel pipeline 150 includes several data processing components such as filters and the like (not shown in detail) in a post-processing component 135 for conditioning the final digital bit stream into a non return-to-zero (NRZ) format and eventually placed on a system bus 175 for use where needed. The control and operation of the aforementioned components is discussed in further detail below with respect to FIGS. 3 and 4 in two particular embodiments of the HDD system 100 of FIG. 1. Prior to discussing such components, the specific manner in which data may be read out will be better understood with reference to FIGS. 2A-2C.

Figure 2A:
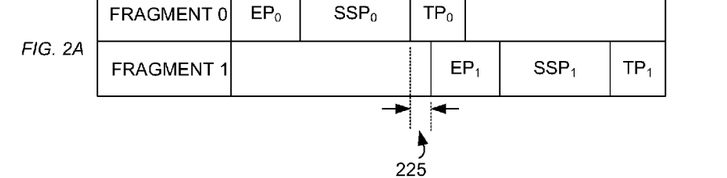
FIG. 2A is a timing diagram showing a back-to-back timing schema for fragment processing of data that may be implemented in the HDD system of FIG. 1 according to an embodiment of the subject matter discussed herein.

FIG. 2A is a timing diagram showing a back-to-back timing schema for fragment processing of data that may be implemented in the HDD system of FIG. 1. When data is received from a read head (112 of FIG. 1) or a communications channel, it is often handled in groupings of data so that error-correction and other related parity checks can be made to ensure that the data has been read correctly. Thus, the groupings may typically be organized into symbols—an eight or ten bit grouping of data bits handled together. Further, a larger grouping of bits may comprise a block of code (sometimes called a code word) that comprises 4096 bits or roughly 410 symbols (when 10-bit symbols are used). In this respect, data may be read out on a block-by-block basis and error-correction and parity checking may be accomplished statistically with respect to a block of symbols.

As bits traverse through the read channel pipeline, the stream of bits may typically comprise three identifiable portions. For purposes herein, each grouping will simply be called a fragment as it is understood that a fragment could be a block, a partial block, or any other suitable grouping of data bits. Thus, in each fragment, one may consider a first portion to be an early period (EP). This initial portion is at the beginning of the fragment to be read and may include such information as a preamble and a sync mark. During the EP, the processing blocks of the read channel pipeline (150 of FIG. 1) may be synchronized. For example, path accumulator registers (not shown in any FIG.) of the Viterbi detector (122 of FIG. 1) may need to be all reset to zero, and a tau accumulator (not shown in any FIG.) of the interpolated timing recovery (ITR) (113 of FIG. 1) may also need to be set to zero.

After the EP, actual data to be used in the operation may be part of a steady-state period (SSP). The bits in the SSP are the actual data to be used. For example such underlying data may be audio information from a received phone call or textual data in a word processing document. Lastly, the final portion of any given fragment is called a trailing period (TP). The TP may typically include parity bits that may be used in data verification and error-correction and is often a rather small number of bits as compared to the SSP.

Thus, as a first fragment 0 is fed to the read channel pipeline, the $EP_0$ is processed first to initialize the processing blocks of the read channel pipeline. Then the data itself is processed in the $SSP_0$. Finally the $TP_0$ is processed for error-checking and parity. In this timing schema, the fragments are back-to-back. This means that as the last bits of the $TP_0$ are leaving the initial processing blocks (e.g., ITR 113, VGA 114, etc.) of the read channel pipeline, the initial processing blocks are again ready for a new fragment (e.g., fragment 1). Thus, fragment 1 may begin processing in its $SP_1$ as the $TP_0$ is finishing up at the final processing blocks (e.g., RMU 130, post-processing 135, etc.). Then, as previous, the $SSP_1$ and $TP_1$ are also subsequently processed as each bit steps through the read channel pipeline.

Typically, for a back-to-back timing schema to function properly in the context of a state-machine controlled read channel pipeline, the next fragment must closely follow the fragment currently being processed. At most, the EP of the next fragment must follow within a time period 225 of 20 bits in order for the back-to-back timing schema to function properly. As briefly mentioned in the background, in a conventional system, the control of operations of the different processing blocks of the read channel pipeline (150 of FIG. 1) during each of these three periods of reading the fragment is accomplished by using one or more state machines. For example, the Viterbi detector (122 of FIG. 1) may be a state machine that steps through a specific sequence of operations for each incoming bit. Additionally, there may typically be a master state machine that controls one or more of the other processing blocks of the read channel pipeline. Because the state machine cannot recognize a gap between fragments, the EP of the next fragment must immediately follow the TP of the previous fragment. Such a restriction may be problematic if the data stream is interrupted for any number of reasons.

An additional problem with using one or more state machines is that processing steps are very complex and once a state machine is crafted and deployed, the processing steps are also very inflexible. That is, once the state machine is designed for a specific read channel pipeline application, to change one or more functions of the read channel pipeline, it becomes necessary to redesign the state machine. Because the state machine is implemented in hardware, the actual circuitry must be redesigned and this requires a new design process, testing with simulation software, prototypes developed in silicon, testing the prototypes to ensure proper operation, etc. Obviously, this is time consuming and expensive if changes need to be made. Furthermore, separate state machines need to be designed for each different application of the read channel pipeline, even if there are only slight differences in the functionality. Again, this requires customization for each particular application. Thus, instead of using inflexible state machines, an embodiment as discussed below with respect to FIG. 3 may include a plurality of vector sequencers that may utilize more flexible timing schemas as shown in FIGS. 2B and 2C.

Figure 2B:
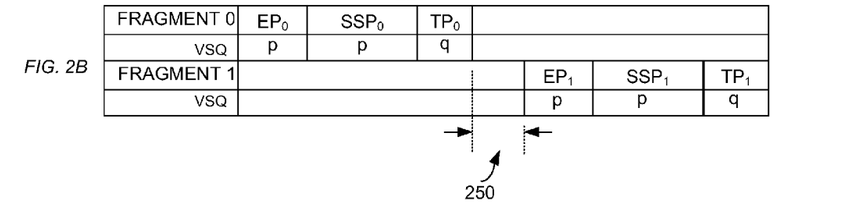
FIG. 2B is a timing diagram showing a non-overlapped timing schema for fragment processing of data that may be implemented in the HDD system of FIG. 1 according to an embodiment of the subject matter discussed herein.

FIG. 2B is a timing diagram showing a non-overlapped timing schema for fragment processing of data that may be implemented in the HDD system of FIG. 1. As will be discussed in greater detail below, a read channel pipeline that is controlled by two vector sequencers (simply referred to as p and q for the purposes of FIGS. 2B and 2C) may be more flexible with respect to fragment timing when processing the received bit stream.

In the non-overlapped timing schema example of FIG. 2B one can see (as one might expect by the schema name) that there is no overlap of fragment 0 and fragment 1 within the read channel pipeline. That is, in this situation, the read channel pipeline completely finishes processing fragment 0, before it begins processing fragment 1. Thus, a considerable timing gap 250 may exist between fragments—a situation that was not capable of being handled by a state-machine controlled read channel pipeline. During the $EP_0$, the p vector sequencer is in control of the entire read channel pipeline. Likewise, during the $SSP_0$, the p vector sequencer is also in total control of all the processing blocks of the read channel pipeline. But during the $TP_0$, the q vector sequencer takes over and completes the processing of the remaining bits in the $TP_0$. That is, during the $TP_0$, the commands to the processing blocks of the read channel pipeline are provided by the q vector sequencer instead of the p vector sequencer. As such, the p vector sequencer becomes idle while the q vector sequencer takes over. Once the $TP_0$ is completed, the p vector sequencer again reverts back to control and awaits fragment 1. $EP_1$, $SSP_1$ and $TP_1$ are again handled the same as described for fragment 0. The nature and advantages of using a p vector sequencer and a q vector sequencer in this capacity will be addressed further below with respect to FIG. 3. Next, however, a different timing schema is illustrated in FIG. 2C.

Figure 2C:
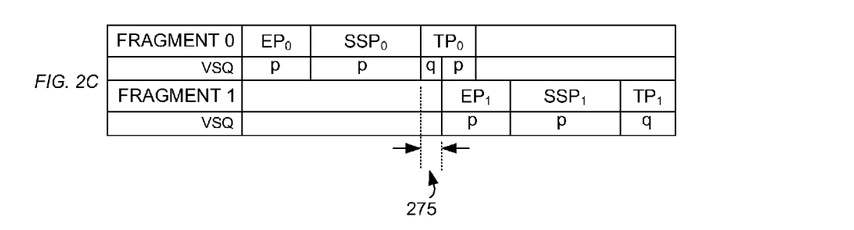
FIG. 2C is a timing diagram showing an overlapped timing schema for fragment processing of data that may be implemented in the HDD system of FIG. 1 according to an embodiment of the subject matter discussed herein.

FIG. 2C is a timing diagram showing an overlapped timing schema for fragment processing of data that may be implemented in the HDD system of FIG. 1. In the overlapped timing schema example, one can again see (as one might also expect by the schema name) that there is an overlap of fragment 0 and fragment 1 within the read channel pipeline. That is, in this situation, the read channel pipeline has not yet finished processing fragment 0, before it begins processing fragment 1. Thus, only a few bits gap 275 may exist between fragments.

As before, during the $EP_0$, the p vector sequencer is in control of the entire read channel pipeline. Likewise, during the $SSP_0$, the p vector sequencer is also in control of the read channel pipeline. Also as before, during the $TP_0$, the q vector sequencer takes over the processing of the remaining bits in the $TP_0$. However, as the next fragment 1 enters the read channel pipeline, control is shifted immediately back to the p vector sequencer. As such, the p vector sequencer now controls the read channel pipeline as it finishes up the $TP_0$ while beginning to initialize the read channel pipeline for the $EP_1$. This p vector sequencer is in control here while the q vector sequencer goes back to idle. $EP_1$, $SSP_1$ and $TP_1$ are again handled the same as described for fragment 0. The nature and advantages of using a p vector sequencer and a q vector sequencer in this capacity will be also addressed further below with respect to FIG. 3.

Figure 3:
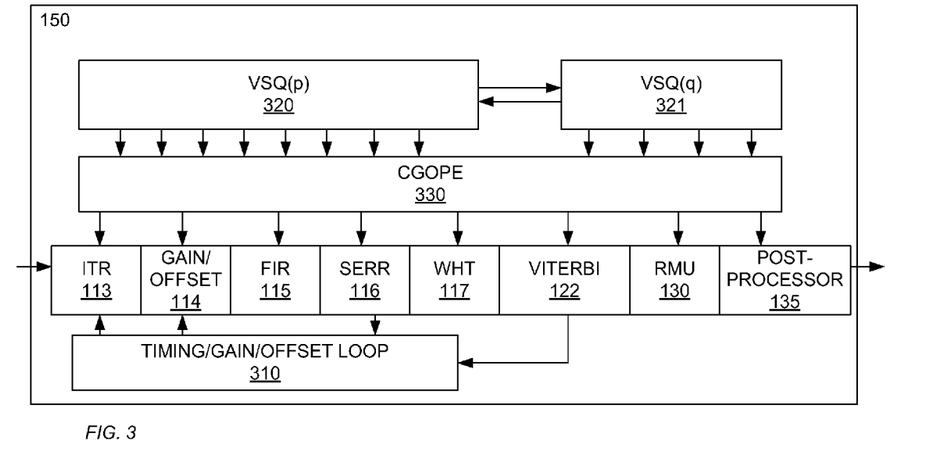
FIG. 3 is a block diagram of a read channel pipeline of FIG. 1 according to an embodiment of the subject matter discussed herein.

FIG. 3 is a block diagram of a read channel pipeline 150 of FIG. 1 according to an embodiment of the subject matter described herein. The read channel pipeline 150 of FIG. 3 shows the same processing blocks as shown in FIG. 1, namely ITR 113, VGA 114, FIR 115, SERR 116, WHT 117, Viterbi detector 122, RMU 130 and post processing block 135. Further, FIG. 3 also shows a timing/gain/recovery loop 310 that was briefly discussed above with respect to each processing block in FIG. 1. Collectively, each of these processing blocks is controlled by one or more bits from a command word that provides various enable signals to each processing block. The command word comes from a register called a Cooperative Generation Of Pipeline Enables (CGOPE) block 330. The CGOPE 330 is a logic block that couples the proper command word or portion of the command word to the proper processing blocks of the read channel pipeline 150.

For example, the CGOPE 330 may be loaded with a first command word that initializes all processing blocks during an EP. Such a command word may comprise a series of bits wherein specific bits corresponding to the specific processing blocks that need to be initialized (e.g., the ITR 112 and the Viterbi detector 122) are set to "1" to enable initialization. The command word comprises fields where each field corresponds to a particular processing block. The actual bit values within the field can then configure each respective processing block to operate in a particular manner. Of course, a skilled artisan understands that the logical "initialize" command word may include several bits for one processing block and the particular pattern of bits for the group that may control any given block may be any combination of bits. That is, the initialization of the ITR block 112 may comprise a portion of the command word that includes four bits of "1001" as two bits of the four bits for the ITR block 112 may require a logic-1 signal. As such, when all bits for all processing blocks are considered, the resulting sequence of bits is simply referred to as the command word and is implemented through the CGOPE 330.

Each processing block in the read channel pipeline 150 will then act accordingly depending on its enable bits that are part of the command word in the CGOPE 330. As the command word changes, each processing block may then act differently according to its enable configuration. As such, a digital signal emanating through the pipeline can be processed accordingly.

In order to load the proper command word into the CGOPE 330, one or more vector sequencers (e.g., VSQ(p) 320 and VSQ(q) 321) may be used to step through a chain of command words to be used in the CGOPE 330. A vector sequencer 320 may includes its own clock circuit (not shown in detail) for internal timing signals wherein other components of sequencer may synchronize their operation to these timing signals. In the example embodiments, the vector sequencers 320 and 321 are relatively high speed vector sequencers, executing instructions at a rate of at least 800 MHz. Where multiple steps must be performed within an instruction cycle in order to execute one instruction, the internal clock circuit may generate multiple clock signals differing in phase. As such, specific values may be stored in address registers to select the address from a memory from which a command word is to be read and implemented in the CGOPE 330.

In a simple embodiment (not shown), a single vector sequencer may be used to load different command words into the CGOPE 330. However, in FIG. 3, two vector sequencers 320 and 321 are used to provide additional control over the loading of command words into the CGOPE 330. Using two (or more) vector sequencers to load command words provides for advantageous control over the processing blocks in an effort to utilize the EP, SSP, and TP effectively for each fragment. As such, the timing schemas described above with respect to FIG. 2B and FIG. 2C are described in the context of FIG. 3.

Looking first to the overlapping timing schema as shown in FIG. 2C in the context of the operation of read channel pipeline 150, the p sequencer 320 may be configured to enable (e.g., control) the processing blocks during first and second periods of data, i.e., during the $EP_0$ and $SSP_0$. When the fragment 0 has passed through far enough to get to the $TP_0$, control may be passed to the q vector sequencer 321. This control may be realized by a specific program for operating the p sequencer and the q sequencer in conjunction with each other. Thus, during the $EP_0$ for the fragment 0, the p sequencer loads a command word into the CGOPE 330 that causes each processing block to initialize. When the $SSP_0$ begins, the p sequencer recognizes this transition and a command word is loaded into the CGOPE 330 that causes the processing blocks to recover the underlying data in fragment 0. Then, when the p sequencer 320 recognizes the $TP_0$, control of the read channel pipeline 150 is handed over to the q sequencer 321 which then loads an appropriate command word into the CGOPE 330 for handling the parity data in the $TP_0$. Handing over control to the q sequencer 321 frees up the p sequencer 320 for dealing with the next fragment, e.g., fragment 1.

Now, in the overlapping timing schema, the next fragment (fragment 1) will arrive at the read channel pipeline 150 prior to the $TP_0$ of the previous fragment 0 finishing. When the p sequencer 320 recognizes the $EP_1$ of fragment 1, it wrests control back from the q sequencer 321 and loads a command word into the CGOPE 330 suited to reinitialize the appropriate processing blocks while still allowing the parity data from the previous $TP_0$ to be handled by other processing blocks. In this sense, the CGOPE 330 keeps track of the boundary between the first and second fragments and as the boundary moves to the right through the read channel pipeline 150, the various processing blocks controlled by the p sequencer 320 and the q sequencer 321 are shifting according to the current fragment's period.

Having multiple vector sequencers that may be programmed and reprogrammed allows for customization and field configuration of the read channel pipeline. For example, in systems having code words read from a hard disk with a size of 410 symbols, one may use a field-programmable controller to efficiently handle code words of 410 symbols. However, in some other applications, such as receive circuits for communications devices, the code words may comprise fewer symbols. Thus, the same manufactured controller may be reprogrammed to more efficiently handle code words with fewer symbols than is typical for a read/write circuit in a hard drive application. Further, programming within the context of the same device may be ramped up or down according to processing capacity. That is, with a faster processor available, a different processing strategy may be implemented through the controller to most effectively interpret read/received data. As processor speed slows down (due to heat or other tasks consuming processing time), a second strategy that shifts the manner in which the sequencers cooperate may be implemented to compensate.

Turning next to the operation of the read channel pipeline 150 in the context of FIG. 2B, this timing schema is a non-overlapped timing schema for fragment processing of data that may be implemented in the HDD system of FIG. 1. In this timing schema, the p sequencer 320 may be configured to enable (e.g., control) the processing blocks during first and second periods of data, i.e., during the $EP_0$ and $SSP_0$. When the fragment 0 has passed through far enough to get to the $TP_0$, control may be passed to the q vector sequencer 321. Again, this control may be realized by a specific program for operating the p sequencer and the q sequencer 321 in conjunction with each other. Thus, during the $EP_0$ for the fragment 0, the p sequencer 320 loads a command word into the CGOPE 330 that causes each processing block to initialize. When the $SSP_0$ begins, the p sequencer 321 recognizes this transition and a command word is loaded into the CGOPE 330 that causes the processing blocks to recover the underlying data in fragment 0. Then, when the p sequencer 320 recognizes the $TP_0$, control of the read channel pipeline 150 is handed over to the q sequencer 321 which then loads an appropriate command word into the CGOPE 330 for handling the parity data in the $TP_0$. Handing over control to the q sequencer 321 frees up the p sequencer 320 for dealing with the next fragment, e.g., fragment 1.

Now, in the non-overlapping timing schema, the next fragment (fragment 1) will not arrive at the read channel pipeline 150 prior to the $TP_0$ of the previous fragment 0 finishing. Thus, the q-sequencer 321 may complete the processing of the entire fragment 0 and then hand control back over to the p sequencer 320. When the p sequencer 320 recognizes the $EP_1$ of fragment 1, it is ready to load a command word into the CGOPE 330 suited to reinitialize the appropriate processing blocks. In this sense, the CGOPE 330 keeps track of the boundary between the first and second fragments and as the boundary moves to the right through the read channel pipeline 150, the various processing blocks controlled by the p sequencer 320 and the q sequencer 321 are shifting according to the current fragment's period.

Control between the two vector sequencers 320 and 321 may be accomplished in a number of different manners. In one common control relationship, the p sequencer 320 may be a master to a slave q sequencer 321. Thus, a handshaking relationship may exist between the two vector sequencers such that control is handed to the slave sequencer (e.g., the q sequencer in this case) until the master sequencer (p sequencer 320) needs to garner control again. For example, there may be some situations when the p sequencer 320 needs to stall because there is some missing data or corrupt data in a given fragment. That is, perhaps the sync mark of the fragment was missed and so the p sequencer 320 must wait for a hard disk to spin around again reread this data. In this situation, the q sequencer may still need to accomplish final tasks on a previous fragment, but cannot operate independently of the p sequencer 320. As such, the q sequencer 321 is the slave of the p sequencer 320 so when the p sequencer 320 stalls, then the q sequencer 321 needs to also stall or else improper command words will corrupt the processing steps and lost the entire fragment.

Again, because one can change the command words sent to the CGOPE 330 at various times by a simple programming change, one can easily change the functionality of the read channel pipeline 150 just by changing the programming of the vector sequencers 320 and 321. This provides significant flexibility to the read channel pipeline 150.

In the above examples, the vector sequencers 320 and 321 are, in essence, keeping track of boundaries between fragments as read from a data sector. As may typically be the case, the fragment length is associated with a code word (e.g., 410 symbols). As such, the TP with contain parity data and the boundary between fragments can be tracked via parity. Therefore, keeping track of code word boundaries enables the Viterbi detector 122 to run through a sequence based on the code word length. To keep track of the code word, the vector sequencers 320 and 321 calculate such boundaries through successive subtractions to determine when the end of a code word (e.g., fragment) approaches. That is, in one embodiment, there may be a counter that is set to the length of the code word and so the code word gets decremented by one for each bit that passes (or two in the case of half rate processing). Thus, when the counter reaches zero, the specific code word is finished and a new code word may next be processed. Because the vector sequencers 320 and 321 are programmable, one can program this count value to any length so as to allow the read channel pipeline to work with any length code word.

Furthermore, the p sequencer 320 may determine additional information about the data. For example, again it may know that the code word includes parity information (e.g., two parity bits for this example). Therefore, the p sequencer 320 can provide this information to the q sequencer 321 so the q sequencer can provide the correct commands to the post processing block 135. The post processing block 135 may determine if the parity is correct and may discard the parity bits so that just usable data is outputted in the NRZ signal.

Continuing the above example, an advantage is realized for a time varying Viterbi detector 122. Instead of the Viterbi detector 122 incorporating a conventional state machine to change the parameters of operation (e.g., trellis and path history registers), the p sequencer 320 or the q sequencer 321 can handle this by merely sequencing through the proper command words.

As yet another example advantage, where the FIR 115 has adaptive coefficients, the p sequencer 320 may be able to load a command word that causes the coefficients to update. One example where the FIR 115 is not real time adaptive is where there is another block that may receive statistical data from the read channel pipeline 150. In this case, the FIR coefficients are adapted from this statistical data. Then, during an idle period where no data is being read, these coefficients may be loaded into coefficient memory associated with the FIR 115. So as part of the command word from the p sequencer 320, at the beginning of each data sector, the command may cause the coefficient register to load from a particular place in memory so the coefficients can include historical statistical data initially.

Figure 4:
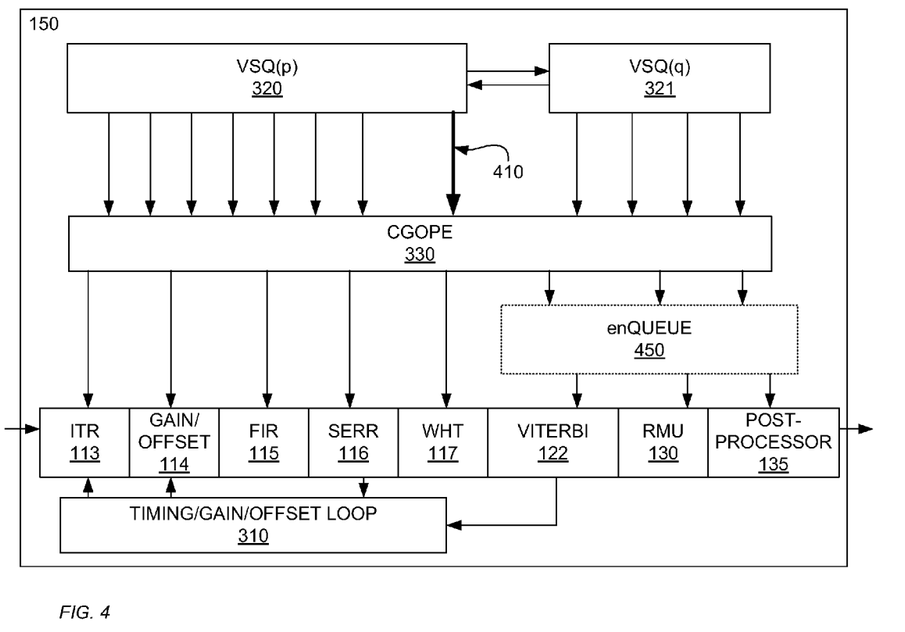
FIG. 4 is a block diagram of a read channel pipeline of FIG. 1 according to another embodiment of the subject matter discussed herein.

FIG. 4 is a block diagram of a read channel pipeline 150 of FIG. 1 according to another embodiment of the subject matter described herein. In this embodiment, the CGOPE 330 may further include enQueue logic 450 for introducing an intentional delay to implementing aspects of command words in the CGOPE 330. These delays may be accomplished by using two or more levels of multiplexers (not shown in detail) for enable signals propagating to processing blocks. The first (lower) level of multiplexers that have outputs coupled to the read channel blocks each have a first input called a p sequencer input, and a second input that may be considered a p sequencer input or a q sequencer input. Then, a second (upper) level of multiplexors may have outputs that are coupled to the p sequencer input or a q sequencer input of the multiplexers in the first (lower) level. Then, p sequencer inputs and the q sequencer inputs are coupled to the p sequencer 320 and the q sequencer 321.

In one operational example then, the second level multiplexer associated with the RMU 135 may have its p sequencer input coupled to the bit field of the p sequencer 320 that is always associated with the RMU 135, i.e., that always has the commands for the RMU, and the q input of that same multiplexer would have its input coupled to the RMU section of the q sequencer 321 as well. Since the p sequencer 320 is the master sequencer, it may generate the select signals for these multiplexers. Thus, because the boundary between two successive fragments is known, and as that boundary moves rightward in the read channel pipeline 150, the select signals effectively move rightward so that in these overlap periods the select signal will go from enabling the q input of the top level multiplexer to the p input of that multiplexer. In the case of an overlapping timing schema, once the overlap period is over, i.e., when the q sequencer 321 notifies the p sequencer 320 that it is finished, then the p sequencer will disable all the top level multiplexers and will generate a select signal for the lower level multiplexers to accept the p input for the entire read channel pipeline. Therefore, the second level of multiplexors introduces a delay to enable the functionality of processing blocks still dealing with TP of each fragment.

Figure 5:
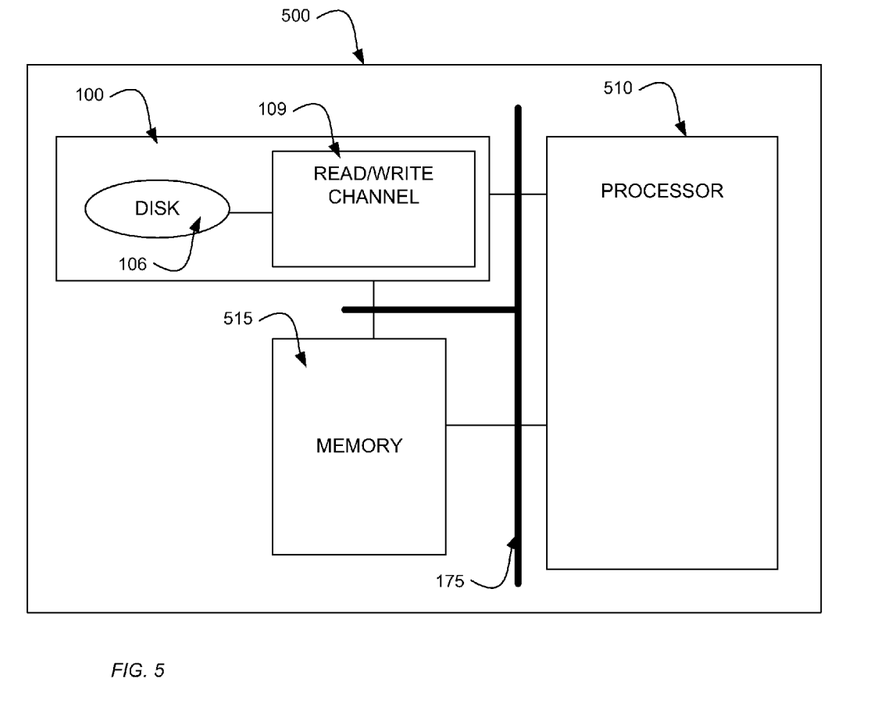
FIG. 5 is a block diagram of an embodiment of a computer system that may implement the HDD of FIG. 1 according to an embodiment of the subject matter discussed herein.

FIG. 5 is a block diagram of an embodiment of a computer system 500 that may implement the HDD system 100 of FIG. 1 according to an embodiment of the subject matter discussed herein. In this system embodiment, the system 500 may include a processor 510 coupled to a local memory 515 and coupled to the HDD system 100. As can be seen, the HDD system 100 includes a hard disk 106. The processor 510 may be configured to control the memory 515 and the HDD system 100 in transferring data to and from the disk 106 and to and from the memory 515. Further, additional data stores and communication channels (not shown) may be used to transfer data to and from the HDD system 100 that may be remote from this computer system 500.

Such a computer system may be any number of devices including a CD player, a DVD player, a Blu-Ray player, a personal computer, a server computer, a smart phone, a wireless personal device, a personal audio player, media storage and delivery system or any other system that may read and write data to and from a storage medium or communication channel.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

The invention claimed is:

1. A read channel, comprising:
an input configured to receive data in blocks having portions;
a plurality of sequential processing blocks configured to manipulate the data received from an input; and
a plurality of controllers coupled to the plurality of sequential processing blocks, at least one first controller configured to exclusively cause the sequential processing blocks to manipulate at least one first portion of the block data during a first control period and at least one second controller configured to exclusively cause the sequential processing blocks to manipulate at least one second portion of the block data during a second control period in response to the first controller indicating transfer of control to the second controller.

2. The read channel of claim 1 wherein the plurality of controllers comprise a plurality of vector sequencers.

3. The read channel of claim 2 wherein each of the plurality of vector sequencers is configured to be programmed with a desired control schema.

4. The read channel of claim 3 wherein each of the plurality of vector sequencers is configured to be re-programmed with a different desired control schema.

5. The read channel of claim 1 wherein the received data comprises blocks of 410 symbols and the portions comprise:
an early period having preamble and synchronization mark data;
a steady-state period having usable data; and
a trailing period having parity data.

6. The read channel of claim 1 wherein the processing blocks comprise:
an interpolated timing recovery component for altering the phase of an actual sample of the data signal;
a variable gain/offset amplifier for acquiring the gain of the read channel
a finite-impulse-response filter for equalizing phase-corrected and sampling-rate-compensated samples;
a sample error recovery component suited to provide additional processing for error-recovery;
a whitener filter block; suited to filter any noise in the digital signal to toward a known white noise signal;
a Viterbi detector configured to determine a digital value for each bit if data read;
a recovery metric unit configured to correct errors in the received data; and
a post-processing component configured to manipulate the data into a no-return to zero format.

7. The read channel of claim 1, further comprising a command register suited to provide a command word for enabling the processing blocks.

8. The read channel of claim 7 wherein the plurality of controllers are coupled to the command register and configured to load a command word in to the command register during each respective controller's operable control period.

9. The read channel of claim 8 further comprising a delay block coupled to the command register and configured to delay at least a portion of the control words to at least one of the processing blocks.

10. The read channel of claim 9 wherein the portion of the control word that is delayed corresponds to a portion of the control word associated with one particular controller.

11. A controller, comprising:
an input configured to receive data in blocks having portions;
a plurality of processing blocks configured to manipulate the data received from an input; and
a plurality of vector sequencers coupled to the plurality of processing blocks, at least one first vector sequencer configured to exclusively cause the processing blocks to manipulate at least one first portion of the block data during a first control period and at least one second vector sequencer configured to exclusively cause the processing blocks to manipulate at least one second portion of the block data during a second control period in response to the first vector sequencer indicating transfer of control to the second vector sequencer.

12. The controller of claim 11 disposed on a single integrated circuit die.

13. The controller of claim 11 disposed on a plurality of integrated circuit dies.

14. The controller of claim 11 further comprising a third vector sequencer configured to cause at least one of the processing blocks to manipulate at least one third portion of the block data during a third controller control period.

15. A system, comprising: a hard-disk-drive configured to store data, the hard disk drive including: a plurality of sequential processing blocks configured to manipulate the data; and a plurality of controllers coupled to the plurality of sequential processing blocks, at least one first controller configured to cause the sequential processing blocks to manipulate at least one first portion of the data during a first control period and at least one second controller configured to cause the sequential processing blocks to manipulate at least one second portion of the data during a second control period in response to the first controller indicating transfer of control to the second controller.

16. The system of claim 15 further comprising a system bus coupled to the hard-disk-drive and a central processor coupled to the system bus.

17. The system of claim 16 further comprising a memory coupled to the system bus and configured to store data read from the storage medium.

18. A system, comprising:
a receiver configured to interface with a communication channel, the receiver including:
a read channel configured to receive data from the communication channel, the data received in blocks having portions;
a plurality of sequential processing blocks configured to manipulate the data; and
a plurality of controllers coupled to the plurality of sequential processing blocks, at least one first controller configured to cause the sequential processing blocks to manipulate at least one first portion of the block data during a first control period and at least one second controller configured to cause the sequential processing blocks to manipulate at least one second portion of the block data during a second control period in response to the first controller indicating transfer of control to the second controller.

19. The system of claim 18 wherein the communication channel comprises a wireless communication channel.

20. The system of claim 19 further comprising:
at least one wireless communication transmission node; and
a second system configured to generate data to be transmitted over the communication channel via the at least one wireless communication transmission node.

21. A method, comprising: receiving a code word from a read channel; processing a first portion of the code word in a read channel such that the processing of the first portion is controlled by a first vector sequencer; the first vector sequencer indicating transferring control of processing from the first vector sequencer to a second vector sequencer; and processing a second portion of the code word in the read channel such that the processing of the second portion is controlled by a second vector sequencer.

22. The method of claim 21 wherein the processing the first portion further comprises processing a portion of the code word corresponding to preamble data and user data.

23. The method of claim 21 wherein the processing the second portion further comprises processing a portion of the code word corresponding to parity data.

24. The method of claim 21, further comprising delaying the processing of the second portion of the code word by a delay time.

25. The method of claim 21, further comprising processing a third portion of the code word in the read channel such that the processing of the third portion is controlled by a third vector sequencer.

26. The method of claim 21, further comprising beginning the processing of a first portion of a second code word with the first vector sequencer while the second vector sequencer is still processing the second portion of the initial code word by returning control of a portion of the processing to the first vector sequencer.

27. A method, comprising: programming a plurality of vector sequencers to process code words according to a first schema, the first schema transferring control from a first vector sequencer to a second vector sequencer during processing of code words; processing a first code word in a read channel according to the first schema; reprogramming the plurality of vector sequencers to process code words according to a second schema; and processing a second code word in a read channel according to the second schema.

28. The method of claim 27 wherein the first schema corresponds to a first hard-disk drive read schema suited to handle code words of 410 symbols and the second schema corresponds to a second hard-disk drive read schema suited to handle code words of 250 symbols.

29. The method of claim 27 wherein the first schema corresponds to a first communications schema suited to handle code words of a first length and the second schema corresponds to a second communications schema suited to handle code words of a second length.

30. The method of claim 27, wherein the programming comprises loading a command word into a command register coupled to the plurality of vector sequencers.

* * * * *